United States Patent [19]
Williams

[11] 3,989,858
[45] Nov. 2, 1976

[54] RUSK BASED FOOD SNACK

[75] Inventor: David Arthur Williams, Ashby-de-la-Zouch, United Kingdom

[73] Assignee: United Biscuits Limited, Edinburgh, Scotland

[22] Filed: Sept. 3, 1974

[21] Appl. No.: 502,383

[30] Foreign Application Priority Data
Sept. 19, 1973 United Kingdom............... 43961/73

[52] U.S. Cl.............................. 426/552; 426/559; 426/560; 426/440; 426/496
[51] Int. Cl.²........................................ A21D 2/00
[58] Field of Search .......... 426/142, 152, 438, 439, 426/516, 496, 347, 346, 440, 145, 138, 141, 289, 439, 552, 446, 559, 450, 560, 496, 503

[56] References Cited
UNITED STATES PATENTS

| | | | |
|---|---|---|---|
| 3,190,755 | 6/1965 | Peden, Jr. ....................... | 426/346 X |
| 3,259,503 | 7/1966 | Tan et al............................. | 426/141 |
| 3,486,904 | 12/1969 | Ziegler............................... | 426/438 |
| 3,505,076 | 4/1970 | Maloney et al. ................ | 426/141 X |
| 3,647,474 | 3/1972 | Dame, Jr. ........................... | 426/152 |
| 3,656,966 | 4/1972 | Ball et al........................ | 426/141 X |
| 3,666,511 | 5/1972 | Williams et al. ................ | 426/141 X |
| 3,703,379 | 11/1972 | Cummisford et al. ............. | 426/346 |

FOREIGN PATENTS OR APPLICATIONS

| | | | |
|---|---|---|---|
| 6,505,111 | 6/1970 | Japan................................. | 426/347 |
| 7,234,138 | 8/1972 | Japan................................. | 426/438 |

*Primary Examiner*—Frank W. Lutter
*Assistant Examiner*—N. Greenblum
*Attorney, Agent, or Firm*—Darbo, Robertson & Vandenburgh

[57] ABSTRACT

A snack food product is made by frying in hot oil thin pieces of dough made from rusk crumbs, starch, water and, as desired, flavoring and emulsifying ingredients. The product is characterized by relatively dense surface layers and porous interiors.

16 Claims, 16 Drawing Figures

RUSK BASED FOOD SNACK

BACKGROUND OF THE INVENTION

Manufactured food snacks simulating potato chips, for instance, are usually made from vegetable and grain flours with admixtures such as starches, both raw and gelatinised, and additives such as monosodium glutamate and glycerol monostearate. The mixtures are made into dough, cut into suitable pieces, and fried.

SUMMARY OF THE INVENTION

Bread rusk is to be used as a main ingredient of manufactured food snack.

DESCRIPTION OF THE DRAWINGS

In the accompany drawing.

DESCRIPTION OF SPECIFIC EMBODIMENTS

Figure 1:
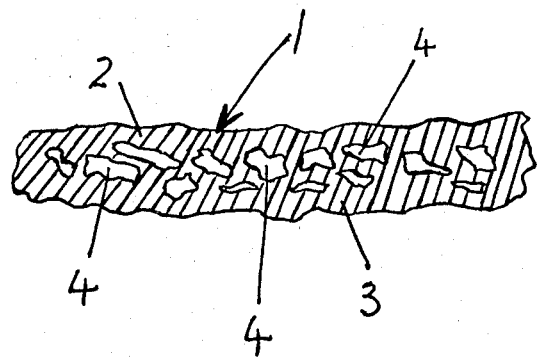
FIGS. 1 and 2 show cross-sections through portions of fried food snacks a main ingredient of which is bread rusk in accordance with the invention.

This invention relates to a manufactured and fried food product and to a method of manufacture of the product. The invention has particular, though not exclusive, application to such products intended for sale as 'snacks'.

Food products in accordance with the invention are made by mixing rusk with a raw starch and water to a dough, forming the dough into pieces and frying the pieces. The word 'rusk' when used in this specification, includes any cooked product of a grain based dough, whether it has been raised with yeast or not. The most common form of rusk is breadcrumbs and these are generally made by baking leavened bread in small portions and then reducing the baked bread to crumbs. The most commonly used grain is wheat, though other grains for example maize, which is also known as corn, or yellow corn can be used.

Methods of manufacture in accordance with the invention will now be described by way of example.

In one method of manufacture of a food produce in accordance with the invention the following ingredients, in the quantities stated, were placed in a small 'Hobart' mixer bowl and preblended, using a standard paddle running at low speeds, for two minutes: bread rusk 270.0 g.; tapioca starch 300.0 g.; salt 13.5 g.; monosodium glutamate 1.5 g.; glycerol monostearate 2.0 g. To this dry mixture, there was then added, with agitation, 460.0 g. of water over a period of 20 seconds and mixing was continued for a total time of 4 minutes. The dough was then transferred to an extruder which was used to form the dough into a tube by extruding it through a cylindrical die having an overall diameter of 0.50 inches and an annular gap of 0.045 inches. As the tube emerged from the die it was cut into pieces which were approximately 0.50 inches long and thus formed annular bands. The pieces were then dropped directly into frying oil which was at 350° F. After approximately 90 seconds, the pieces were fried and were removed from the oil. In the course of frying the surface portions of the pieces are initially cooked and formed into relatively dense outer layers or wall portions and the subsequent cooking causes expansion of the inner portions to take place as a result of which the inner portion is full of holes thereby providing a cellular structure which is less dense than the outer portions. The moisture content of the samples made by the method described was 1.6% and the oil content was 27.3%. The thickness of the bands was on average 0.074 inches, showing an expansion ratio around 1.65 from the annular gap thickness of 0.045 inches. Expansion ratio is the term used to describe the ratio between the thickness of a band after and before frying. The texture of the products made by the method described was light and crisp, and the flavour of the basic product described was typical of that of fried bread.

It has been found that a ratio of starch to rusk between 2:1 and 1:2 gives a product whose texture is crisp and light while not feeling too hard in the mouth. Thus in one example 390.0 g. of bread rusk were mixed with 180.0 g. of tapioca starch, together with the other ingredients in the amounts previously described to give a product which is generally acceptable. However, the qualities of texture, flavour and feeling in the mouth are subjective qualities, which can be varied according to taste within the scope of the present invention. Thus ratios of starch to rusk beween 4:1 and 1:4 could well be used according to taste.

In the particular example described the salt and monosodium glutamate are added to the dough as flavouring or flavour enhancers. They are optional materials which could, of course, be added in other amounts according to taste, be omitted, or be replaced by other flavouring or flavour-enhancing materials. The glycerol monostearate is an emulsifier, added to the dough to aid extrusion, and this is also an optional material which could be added in some other quantity, or be omitted or some other material which aids extrusion could be used.

Other typical dough ingredients are:

| | |
|---|---|
| Bread Rusk | 2,700 g. |
| Tapioca Starch | 2,400 g. |
| Pregelatinised Starch | 600 g. |
| Emulsifier | 20 g. |
| Flavourings | 150 g. |
| Water | 4,000 g. |

The finished product had an oil content of 20.21% and had expanded by a factor of 2.2. A similar product but without the pregelatinised starch expanded by a factor of only 1.9 and had an oil content of 25.27%. There does not appear to be a correlation between oil content and pregelatinised starch content in general.

The other example refers to the use of vegetable powders:

| | |
|---|---|
| Bread Rusk | 2,160 g. |
| Tapioca Starch | 3,000 g. |
| Pea Flour | 840 g. |
| Emulsifier | 20 g. |
| Flavourings | 150 g. |
| Water | 4,800 g. |

The finished fried product had an oil content of 30.45% and showed an expansion ratio of 2.02.

As has been explained, the dough expands during the frying process giving a product with a porous centre contained within a relatively dense continuous surface layer. This structure is essentially responsible for the desired crisp texture and feeling of the product in the mouth and a preferred expansion ratio giving this texture is between 1.6 and 3.0, though ratios as low as 1.2 and as high as 3.5 can be used. Control of the expansion is preferably achieved by controlling the moisture content of the wet dough. Preferably the moisture content is between 40% and 45% by weight of the dough, though it can be varied between 35% and 50%.

The expansion of the material is also a function of the ingredients of the mixture and of the frying process. Thus partial replacement of the raw starch by pregelatinised starch in the dough will increase the degree of expansion. The particular vegetable source of the starch, the level of starch addition and the frying temperature will also affect the expansion ratio. Preferred raw starches are tapioca and farina, although other starches may be used. Bread rusk, made by comminuting and drying either yeast raised bread or unleavened bread, is preferably employed because of the inherent flavour characteristics. Low crust material is preferred, since the resultant produce has a more regular surface colour and texture than products derived from high crust rusk. The rusk material can be partially replaced by vegetable powders, for example potato granules and pea flour.

The use of rusk as a raw material in the manufacture of food products according to the invention has the advantages over previously proposed materials, such as potato solids, that it is possible to control the raw material so that there is less variation in the product, that there are considerably lower reducing sugar contents leading to better control of the colour of the fried product, and that the product has a novel flavour.

It will be appreciated that the wet dough pieces can be formed in other ways than by extrusion and cutting. For example the dough can be formed into sheets, rolled until a desired thickness has been obtained and then cut. It has been found that the most desirable textures are obtained if the thickness of the pieces before frying is between 0.030 and 0.050, and preferably their thickness should be between 0.020 and 0.080, these thicknesses also being in inches.

Figure 2:
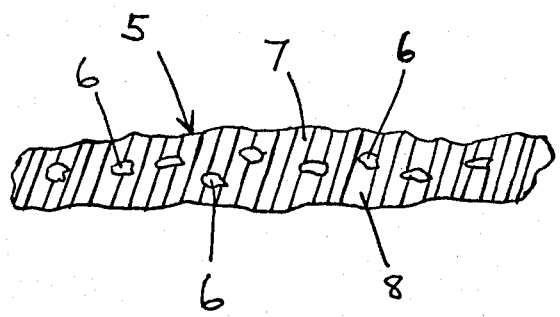

Food products in accordance with the invention will now be described, by way of example, with reference to the accompanying drawing in which FIGS. 1 and 2 show cross-sections through portions of food products.

Referring to FIG. 1 there is shown a cross-section through a product 1 made in accordance with the one method of manufacture previously described in detail. It will be seen that the product 1 has wall portions 2 and 3 which are continuous and that the inner portion of the product has a cellular construction containing a plurality of holes 4 formed during the expansion of the product. The expansion ratio is approximately 1.6.

In FIG. 2 there is shown a cross-section through a product 5 made by reducing the moisture content of the dough mixture, which otherwise is the same as that of the product shown in FIG. 1, so that an expansion ratio of only 1.2 is obtained. In this embodiment it can be seen that the holes 6 are smaller than the holes 4 of FIG. 1 and that the walls 7 and 8 are thicker than those of the FIG. 1 embodiment.

It will thus be understood that the present invention provides both a method of making an expanded food product by shaping and frying a dough based on rusk and an expanded food product made by the method.

The rusk is preferably mixed with raw, ungelatinised starch and water, shaped by extrusion and cut before being fried. Alternatively the dough can be formed in sheets, rolled to a desired thickness and cut or stamped before being fried.

The starch in the dough can be tapioca and/or farina and the ratio of rusk to raw starch is preferably in the range between 1:2 to 2:1. Small proportions of pregelatinised starch, in the order for example of 5% to 10% of the total starch content, can be added to the dough to aid expansion during frying and the rusk can be partially replaced, for example in the order of 10% to 20% of the total rusk content, by other vegetable powders and/or flours.

It will be appreciated that the preferred form of cooking the grain based dough to produce rusk is by baking, and that other forms of cooking that produce partial dehydration, for example cooking in a microwave oven, with or without a subsequent toasting step, can be used.

It will also be understood that the use of rusk as a raw material makes possible a wide range of flavours in a very simple manner since the composition of the rusk can be tailored according to taste by the use, for example, of a variety of grains or of a flour giving a white rusk or a brown rusk.

I claim:
1. A process for the manufacture of an expanded food product, which consists essentially of the steps of:
   1. providing a quantity of a particulate rusk material derived by baking a water-containing grain-based dough and thereafter comminuting the resultant baked product;
   2. formulating a second dough by admixing together
      a. the particulate rusk material of step (1),
      b. a raw starch, and
      c. water;
   3. forming said second dough into discrete pieces; and
   4. subjecting the discrete dough pieces to a frying step, whereby the dough pieces undergo expansion whilst being fried to produce expanded food product pieces characterized by having a relatively more porous internal structure within a less porous external structure.

2. The process of claim 1, wherein pregelatinized starch is also incorporated into said second dough in amount less than about 10 percent of the total starch context.

3. The process of claim 1, wherein said starch and said rusk material are present in said second dough in proportions within the range from 4:1 to 1:4 by weight.

4. The process of claim 1, wherein said starch and said rusk material are present in said second dough in proportions within the range from 2:1 to 1:2 by weight.

5. The process of claim 1, wherein said second dough has a water content in the range from 35 percent to 50 percent by weight.

6. The process of claim 5, wherein said water content is in the range from 40 percent to 45 percent, based on the total weight of the rusk/starch dough prior to the frying step (4).

7. The process of claim 1, wherein the raw starch is selected from the group consisting of tapioca starch and farina starch.

8. The process of claim 1, wherein said second dough contains at least one vegetable powder in amount of 10 to 20 percent by weight of the rusk material.

9. The process of claim 8, wherein said vegetable powder is selected from the group consisting of potato granules and pea flour.

10. The process of claim 1, wherein said frying step (4) is conducted so that the dough pieces exhibit a volume expansion of at least 1.2 times on conversion to the expanded food product.

11. The process of claim 1, wherein said frying step (4) is conducted so that the dough pieces exhibit an expansion ratio in the range from 1.6 to 3.0 times the volume of the dough pieces prior to the frying step (4).

12. A process for the manufacture of an expanded fried food product, which consists essentially of the steps of:
 1. formulating a first water-containing dough by admixing water, yeast, and a grain flour selected from the group consisting of wheat, maize, corn and yellow corn;
 2. baking said first dough;
 3. reducing the resultant baked product of step (2) to a rusk material in particulate form;
 4. formulating a second water-containing dough by admixing the particulate rusk material of step (3), water, raw starch and flavoring agents;
 5. shaping said second water-containing dough by a forming operation selected from the group consisting of extrusion and sheeting out;
 6. cutting the shaped dough into discrete pieces; and
 7. subjecting the discrete pieces to frying in cooling oil under such time and temperature conditions as to effect expansion of said discrete pieces by at least 1.2 times to produce expanded food product items characterized by having a relatively more porous internal structure within a less porous external structure.

13. The process of claim 12 wherein the second dough is shaped to a pre-fried thickness in the range of 0.020 to 0.080 inches and undergoes an expansion in the range of 1.6 to 3.0 times during the frying step.

14. The process of claim 12 wherein the second dough is extruded, the extrusion is cut at intervals to form the said discrete dough pieces and the dough pieces are placed directly into heated cooking oil.

15. The process of claim 14 wherein the second dough is extruded through an annular extrusion die and the resultant product thereby has the form of discrete rings.

16. The process of claim 13, wherein the dough pieces are fried in cooking oil at a temperature of about 350° F for a frying time of about 90 seconds.

* * * * *

UNITED STATES PATENT AND TRADEMARK OFFICE
CERTIFICATE OF CORRECTION

PATENT NO. : 3,989,858
DATED : November 2, 1976
INVENTOR(S) : David Arthur Williams It is certified that error appears in the above-identified patent and that said Letters Patent are hereby corrected as shown below:

In the Heading Page,
"16 Drawing Figures" should read --2 Drawing Figures--

Col. 6, l. 1 "cooling" should read --cooking--

Signed and Sealed this

First Day of February 1977

[SEAL]

Attest:

RUTH C. MASON
Attesting Officer

C. MARSHALL DANN
Commissioner of Patents and Trademarks